United States Patent [19]

Nam

[11] Patent Number: 5,121,471
[45] Date of Patent: Jun. 9, 1992

[54] APPARATUS FOR ALIGNING THE PRINTING DATA OF A SERIAL PRINTER

[75] Inventor: Byoung-Deok Nam, Suwon, Rep. of Korea

[73] Assignee: SamSung Electronics Co., Ltd., Suwon, Rep. of Korea

[21] Appl. No.: 636,420

[22] Filed: Dec. 31, 1990

[30] Foreign Application Priority Data

Apr. 9, 1990 [KR] Rep. of Korea ......... 1990-4838[U]

[51] Int. Cl.⁵ .......................................... G06K 15/00
[52] U.S. Cl. .................................. 395/115; 395/110; 395/117
[58] Field of Search .............................. 364/518–520, 364/930 MS, 235 MS; 346/154, 153.1, 150, 108; 101/93.05; 400/119–124

[56] References Cited

U.S. PATENT DOCUMENTS 3,651,258  3/1972  Ammann .......................... 346/108
4,431,319  2/1984  Kakaki et al. ................. 101/93.05

Primary Examiner—Arthur G. Evans
Attorney, Agent, or Firm—Robert E. Bushnell

[57] ABSTRACT

There is provided an apparatus for aligning the printing data of a serial printer including: a controller (10) for controlling the system of the serial printer; a decoder (20) for decoding the data signal of the controller to sequentially enable the printing data, the decoder (20) being enabled by the enabling signal of the controller; a first buffer (30) for buffering the printing data of the controller, the first buffer (30) being enabled by the enabling signal of the decoder (20); a second buffer (40) for buffering the data of the first buffer to shift to a desired amount; a shift register (50) for shifting the data of the first buffer to the amount of the odd and even numbered data of the second buffer by the clock pulses applied from the controller, the shift register (50) being enabled by the output of the decoder (20); and a third buffer (60) for buffering the shifted data of the shift register (50) to apply the data to the printer head.

4 Claims, 2 Drawing Sheets

APPARATUS FOR ALIGNING THE PRINTING DATA OF A SERIAL PRINTER

BACKGROUND OF THE INVENTION

The present invention concerns an apparatus for aligning the printing data of a serial printer.

Generally, the combination of the data of odd numbered rows and even numbered rows is carried out in two ways. One is to shift the whole row by a constant interval in order to adjust the data interval caused by the head interval, and the other is to shift a part of the row in order to process a slant character such as an italic.

Conventionally, to this end, a memory point has been employed for the odd and even number or a slant character such as an italic has been developed into dot form in order to obtain the same effect as the whole row is shifted.

Such a data combination method requires an increase in the processing capacity of the microcomputer, or an additional microcomputer and memory for aligning the data of each row, thus resulting in a complex problem.

SUMMARY OF THE INVENTION

The object of the present invention is to provide an apparatus for aligning the printing data of a serial printer by shifting and combining the data of each of the odd and even numbered rows.

According to the present invention, an apparatus for aligning the printing data of a serial printer comprises: a controller for controlling the system of the serial printer; a decoder device for decoding the data signal of the controller to sequentially enable the printing of data, the decoder device being enabled by the enabling signal of the controller; a first buffer device for buffering the printing data of the controller, the first buffer device being enabled by the enabling signal of the decoder device; a second buffer device for buffering the data of the first buffer to shift by a desired amount; a shift register means for shifting the data of the first buffer device by the amount of the odd and even numbered data of the second buffer device with the clock pulses applied from the controller, the shift register means being enabled by the output of the decoder device; and a third buffer device for buffering the shifted data of the shift register means applied to the printer head.

The present invention will now be described with reference to the drawings attached only by way of example.

BRIEF DESCRIPTION OF THE ATTACHED DRAWINGS

FIG. 1 is a circuit diagram for illustrating the apparatus of the present invention; and FIG. 2 is a flow chart for illustrating controlling operation of the controller (10) shown in FIG. 1.

DETAILED DESCRIPTION OF A CERTAIN PREFERRED EMBODIMENT

Figure 1:
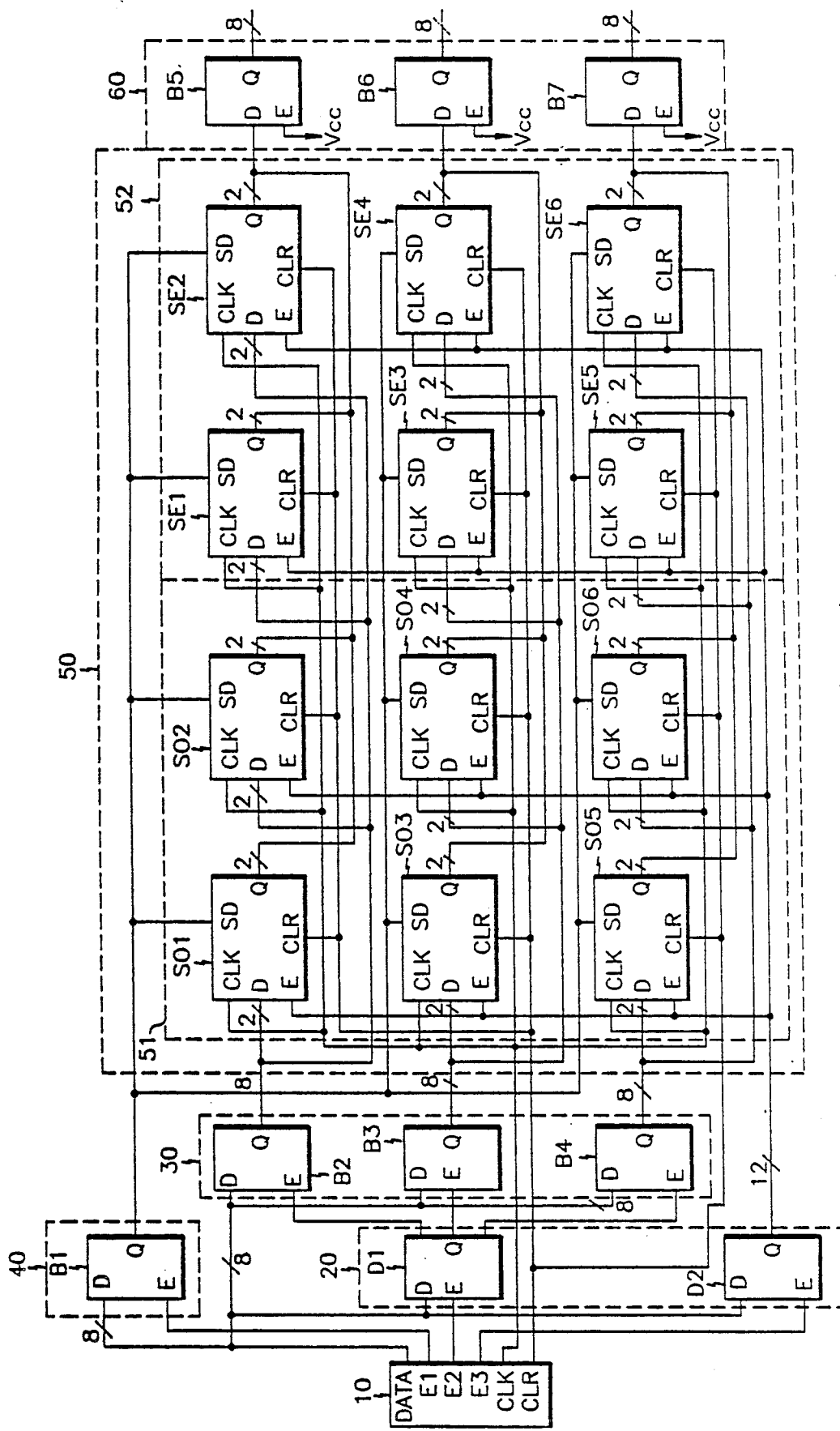

For reference to FIG. 1, E1 indicates an enabling signal applied to a second buffer 40, E2 an enabling signal to decoding element D1, E3 an enabling signal to a decoding element D2, and SD the shift depth of shift register 50.

A controller 10 controls the whole system. The decoder 20 is enabled by the enabling signal of the controller 10 to decode the data of the controller 10 so as to sequentially enable the printing data of the printer. A first buffer 30 is enabled by the enabling signal of the decoder 20 to buffer the printing data of the controller 10. The second buffer 40 receives the printing data and enabling signal of the controller 10 so as to shift the data applied from the first buffer 30 by a desired amount. Shift register 50 is enabled by the output of the decoder 20 to shift the buffered data of the first buffer 30 by the amount of the odd and even numbered data of the second buffer 40 with the clock pulses applied from the controller 10. A third buffer 60 buffers the shifted data of the shift register 50 to provide it to the printer head.

The decoder 20 includes two decoding elements D1 and D2. The decoding element D1 is enabled by the enabling signal of the controller 10 so as to decode the output data thereof, thus sequentially enabling the first buffer 30. The decoding element D2 is enabled by the enabling signal of the controller 10 to decode the output data thereof, thus sequentially enabling the shift register 50. The first buffer 30 includes three buffers B2-B4. The shift register 50 includes a shift register part SO1-SO6 for shifting the odd numbered part of the data, and a shift register part SE1-SE6 for shifting the even numbered part of the data. The third buffer 60 includes three buffers B5-B7.

The operation of the embodiment of the present invention will now be described with reference to FIG. 1.

In order to adjust the data interval caused by the head interval, the data to be shifted must be applied to the shift register 50 only after the shift register 50 is cleared. To this end, the controller 10 enables the second buffer 40 and applies thereto the odd numbered data to shift. Hence, the second buffer 40 is enabled by the signal E1 so as to buffer the shifted amount of the odd numbered data. Currently, the decoding element D2 is enabled by the enabling signal E3 of the controller 10 so as to decode the data thereof, thus sequentially producing a number of enabling signals for the shift register 50.

Then, the shift register elements SO1-SO6 are enabled by the enabling signals of the decoding element D2 to receive the shifted amount of the odd numbered data from the second buffer 40.

Likewise, the controller 10 enables the second buffer 40, and applies thereto the even numbered data to shift via data bus. Thus, the second buffer 40 is enabled by the enabling signal E1 to buffer the shifted amount of the even numbered data. At this time, the decoding element D2 is enabled by the enabling signal E3 of the controller 10 so as to decode the data thereof, thus sequentially producing a number of enabling signals for the shift register 50. Then, the shift register elements SE1-SE6 are enabled by the enabling signals of the decoding element D2 to receive the shifted amount of the even numbered data from the second buffer 40.

Thereafter, the decoding element D1 is enabled by the enabling signal E2 of the controller 10 so as to decode the data thereof, thus sequentially producing the enabling signals for the buffers B2-B4. Then, the buffers B2-B4 are enabled to sequentially buffer the data of the decoding element D1 divided into submultiples each consisting of two bits applied to the corresponding shift register elements SO1-SO6, SE1-SE6. Thus, all of the 24-bit data is applied to the shift register elements SO1-SO6, SE1-SE6 that respectively shift the data with the amount of the odd and even numbered data with the clock pulses of the controller 10. The shifted odd and even numbered data of the shift register elements SO1-SO6, SE1-SE6 are applied through the buffers B5-B6 to the printer head. In printing slanted characters, the procedures are the same as above except that the shifted amount of the odd and even numbered data corresponding to the slant angle are applied differently, from each other, to the printer head.

Figure 2:
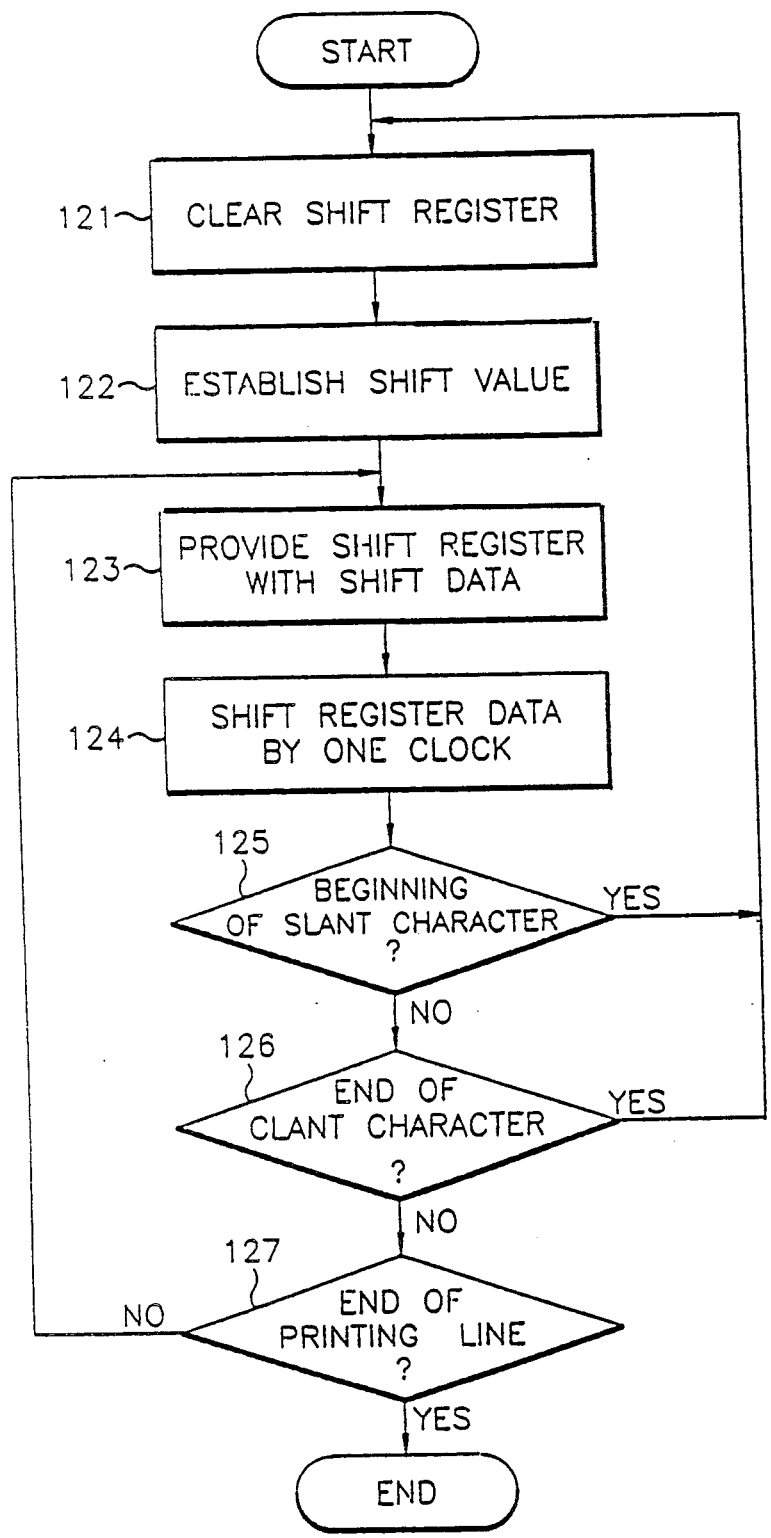

In reference to FIG. 2, the controlling process of the controller 10 comprises the steps of: initializing the shift register 50; establishing the shifted amount of the odd and even numbered data in the first buffer 40; applying the data to each of the shift register elements SO1-SO6, SE1-SE6 so as to shift the printing data by one clock pulse; checking whether the shifted data is a slanted character; checking whether the slanted character is the end of the shifted data is determined to be a slanted character in the immediately preceding step; and checking whether the slanted character is at the end of a line printing if the slanted character is not to be the slanted end in the immediately preceding step.

More specifically describing the controlling process, in step 121 the shift register 50, is cleared to initialize the system. In step 122, the shifted data amount of the odd and even numbered shift register elements SO1-SO6, SE1-SE6 is established and is applied to the first buffer 40. In step 123, the shifted data is applied to each of the shift register elements SO1-SO6, SE1-SE6. In step 124 the data of the shift register 50 is shifted by one clock pulse in response to the clock pulses of the controller 10. In step 125 a check is made to determine whether a slanted character begins or not, according to which step 121, or 126, is carried out. In the step 126, a check is made to determine whether the slanted character ended or not, according to which step 121 or 127, is carried out. In the step 127, a check is made to determine whether line printing ended or not, in dependence upon whether the printing ended or the step 123 is carried out.

As described above, the apparatus of the present invention shifts and combines the data of each of the odd and even numbered data rows of a serial printer so as to considerably increase the printing speed.

The present invention is illustrated and described with reference to a preferred embodiment, will be understood by those skilled in the art that modifications in detail may be made without departing from the spirit and scope of the invention.

What is claimed is:

1. An apparatus for aligning printing data of a serial printer, comprising:

a controller for controlling the system of said serial printer;

decoder means for decoding a data signal of said controller to sequentially enable the printing data, said decoder means being enabled by an enabling signal of said controller;

first buffer means for buffering the printing data of said controller, said first buffer means being enabled by the enabling signal of said decoder means;

second buffer means for receiving the printing data and enabling signal of said controller to buffer the data of said first buffer *means* to shift [to] *by* a [desired] *first* amount;

shift register means for shifting the data of said first buffer means to the amount of odd and even numbered data of said second buffer means by clock pulses applied from said controller, said shift register means being enabled by [the] output of said decoder means; and third buffer means for buffering the shifted data of said shift register means to apply the data to a printer head.

2. An apparatus for aligning the printing data of a serial printer as claimed in claim 1, wherein said decoder means comprises:

a first decoder for decoding the output data of said controller to sequentially enable said first buffer means, said first decoder being enabled by the enabling signal of said controller; and a second decoder for decoding the output data of said controller to sequentially enable said shift register means, said second decoder being enabled by the enabling signal of said controller.

3. An apparatus for aligning the printing data of a serial printer as claimed in claim 1, wherein said shift register means comprises:

a first shift register for shifting the odd numbered data; and a second shift register for shifting the even numbered data.

4. An apparatus for aligning the printing data of a serial printer as claimed in Claim 2, wherein said shift register means comprises:

a first shift register for shifting the odd numbered data; and a second shift register for shifting the even numbered data.

* * * * *

UNITED STATES PATENT AND TRADEMARK OFFICE
CERTIFICATE OF CORRECTION

PATENT NO. : 5,121,471
DATED : June 9, 1992
INVENTOR(S) : Byoung-Deok NAM

It is certified that error appears in the above-identified patent and that said Letters Patent is hereby corrected as shown below:

Column 1, Line 16, insert a comma after "character", and insert a comma after "italic"; and Line 59, replace "For" with --In--.

Column 2, Line 63, replace "with" with --to--.

Line 17, insert --determined-- after "is", and insert --at-- after "be", and delete "slanted" (second occurrence);

Line 20, insert a comma after "121", and delete comma;

Line 23, insert a comma after "established";

Line 28, insert a comma after "125";

Line 29, insert a comma after "step";

Line 30, delete comma (first occurrence); and

Line 40, replace "is" with --, as--.

UNITED STATES PATENT AND TRADEMARK OFFICE
CERTIFICATE OF CORRECTION

PATENT NO. : 5,121,471
DATED : June 9, 1992
INVENTOR(S) : Byoung-Deok NAM

It is certified that error appears in the above-identified patent and that said Letters Patent is hereby corrected as shown below:

Column 4, Line 12, delete "[to]";

Line 13, delete "[desired]"; and

Line 18, delete "[the]".

Signed and Sealed this

Fifteenth Day of September, 1992

Attest:

DOUGLAS B. COMER

Attesting Officer

Acting Commissioner of Patents and Trademarks